(12) United States Patent
Haran (10) Patent No.: US 8,868,324 B2
(45) Date of Patent: *Oct. 21, 2014

(54) RELATIVE VEHICULAR POSITIONING USING VEHICULAR COMMUNICATIONS

(71) Applicant: Autotalks Ltd., Kfar Netter (IL)

(72) Inventor: Onn Haran, Bnei Dror (IL)

(73) Assignee: AutoTalks Ltd., Kfar Netter (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/089,781

(22) Filed: Nov. 26, 2013

(65) Prior Publication Data

US 2014/0129128 A1 May 8, 2014

Related U.S. Application Data

(63) Continuation of application No. 12/996,389, filed as application No. PCT/IB2009/051769 on Apr. 30, 2009, now Pat. No. 8,645,053.

(60) Provisional application No. 61/081,044, filed on Jul. 16, 2008.

(51) Int. Cl.
*G05D 1/02* (2006.01)
*G01S 5/04* (2006.01)
*G01S 11/10* (2006.01)
*G08G 1/16* (2006.01)

(52) U.S. Cl.
CPC . *G08G 1/161* (2013.01); *G01S 5/04* (2013.01); *G01S 11/10* (2013.01)
USPC ........... 701/300; 701/301; 701/408; 701/302; 701/503; 34/993; 34/902; 34/903; 342/455; 342/75; 342/98; 342/99

(58) Field of Classification Search
None
See application file for complete search history.

(56) References Cited

U.S. PATENT DOCUMENTS

| | | | | |
|---|---|---|---|---|
| 5,339,075 A | * | 8/1994 | Abst et al. | 340/903 |
| 5,808,561 A | * | 9/1998 | Kinoshita et al. | 340/903 |
| RE36,819 E | * | 8/2000 | Gellner et al. | 342/70 |
| 6,275,773 B1 | * | 8/2001 | Lemelson et al. | 701/301 |
| 6,405,132 B1 | * | 6/2002 | Breed et al. | 701/301 |
| 6,862,500 B2 | * | 3/2005 | Tzamaloukas | 701/1 |
| 6,925,378 B2 | * | 8/2005 | Tzamaloukas | 701/428 |
| 7,151,467 B2 | * | 12/2006 | Fujita et al. | 340/902 |
| 7,188,026 B2 | * | 3/2007 | Tzamaloukas | 701/522 |
| 7,647,180 B2 | * | 1/2010 | Breed | 701/301 |
| 7,865,213 B2 | * | 1/2011 | Riley | 455/561 |
| 7,974,772 B2 | * | 7/2011 | Nitz et al. | 701/117 |
| 8,022,877 B2 | * | 9/2011 | Alizadeh-Shabdiz | 342/458 |
| 8,645,053 B2 | * | 2/2014 | Haran | 701/300 |
| 2002/0005778 A1 | * | 1/2002 | Breed et al. | 340/435 |
| 2002/0198632 A1 | * | 12/2002 | Breed et al. | 701/1 |
| 2003/0191568 A1 | * | 10/2003 | Breed | 701/36 |
| 2004/0073361 A1 | * | 4/2004 | Tzamaloukas et al. | 701/210 |
| 2004/0230345 A1 | * | 11/2004 | Tzamaloukas | 701/1 |
| 2004/0230370 A1 | * | 11/2004 | Tzamaloukas | 701/200 |

(Continued)

*Primary Examiner* — Thomas Tarcza
*Assistant Examiner* — Richard Goldman
(74) *Attorney, Agent, or Firm* — Mark M. Friedman (57) ABSTRACT

The relative position of one vehicle vs. another vehicle, both driving in a vehicular environment, is determined using vehicular communications based on the IEEE 802.11 standard. The relative position determination is performed in a measuring vehicle using data provided by a measured vehicle through IEEE 802.11 communications carried through beacons as well as GPS or other location data and local map information.

17 Claims, 4 Drawing Sheets

(56) References Cited

U.S. PATENT DOCUMENTS

| | | | |
|---|---|---|---|
| 2004/0230373 A1* | 11/2004 | Tzamaloukas | 701/208 |
| 2006/0224309 A1* | 10/2006 | Schmidt et al. | 701/207 |
| 2007/0152804 A1* | 7/2007 | Breed et al. | 340/435 |
| 2007/0271029 A1* | 11/2007 | Tzamaloukas | 701/200 |
| 2008/0089298 A1* | 4/2008 | Anschutz et al. | 370/338 |
| 2008/0147253 A1* | 6/2008 | Breed | 701/3 |
| 2008/0150786 A1* | 6/2008 | Breed | 342/53 |
| 2009/0140887 A1* | 6/2009 | Breed et al. | 340/990 |
| 2010/0052983 A1* | 3/2010 | Alizadeh-Shabdiz | 342/357.09 |
| 2010/0159833 A1* | 6/2010 | Lewis et al. | 455/41.3 |
| 2010/0169009 A1* | 7/2010 | Breed et al. | 701/208 |
| 2011/0012784 A1* | 1/2011 | Alizadeh-Shabdiz | 342/357.28 |
| 2011/0109482 A1* | 5/2011 | Haran | 340/995.1 |
| 2011/0238300 A1* | 9/2011 | Schenken | 701/207 |
| 2011/0298664 A1* | 12/2011 | Alizadeh-Shabdiz | 342/458 |
| 2012/0038489 A1* | 2/2012 | Goldshmidt | 340/903 |
| 2012/0323474 A1* | 12/2012 | Breed et al. | 701/117 |
| 2013/0265200 A1* | 10/2013 | Silny et al. | 342/451 |

* cited by examiner

RELATIVE VEHICULAR POSITIONING USING VEHICULAR COMMUNICATIONS

FIELD OP THE INVENTION

The invention relates in general to vehicular communications and in particular to determination of vehicle position (or "location") using vehicular communications band on the IEEE 802.11 standard.

BACKGROUND OF THE INVENTION

Present day position systems use the Global Positioning System (GPS) to provide the position of a vehicle (matted herein as "(X, Y, Z)"). The GPS has inherent inaccuracy. The error of a typical GPS receiver can be up to 10 metes. In addition, two GPS receivers, located in proximity, may have different errors resulting from different selection of satellites or different processing orders of satellite signals.

The GPS performance degrades when line-of-sight (LOS) is unavailable. No GPS signal is available inside buildings (such as indoor parking lots) and in tunnels. Skyscrapers also block the GPS signal. In cases like this, non-GPS based location techniques such as dead-reckoning are applied. Dead-reckoning is based on accelerometer or gyroscope information or using vehicle movement information in more advanced systems. The dead-reckoning error increases with usage time. Dead-reckoning can provide approximate positioning for a short period of time, but is ineffective after long usage. GPS improvements include differential GPS (DGPS), which utilizes a tall antenna as a point of reference. All GPS components today support DGPS, which brings the error down to 3 meters. However, the problems of blocked, GPS signals are not solved by this solution.

A major use of position information is in safety applications. While GPS provides a sufficient level of accuracy for navigation purposes, this level of accuracy is not acceptable for supporting safety applications. For example, for reliable safety indications to drivers, the relative accuracy needs to be less than about 1 meter and preferably less than about 0.5 meters. Some cases in which improved position accuracy is needed include:

Obtaining lane specific information—a vehicle braking indication needs to be processed mostly by vehicles in same lane.

Obtaining lane function information—a vehicle driving in a special purpose lane, such as a crossing or a turning lane, needs to be treated differently than vehicles driving in other lames.

Close proximity positioning—exact positioning is critical for determining a probable collision.

Absolute positioning—using a fixed device in a known place, like a Road Side Unit (RSU) in positions with bad GPS signal reception.

Mobility—lane based information can improve mobility estimation.

In summary, in safety applications, the relative positioning between two vehicles has higher importance than absolute global positioning.

Cooperative safety systems based on vehicle-to-vehicle communication show great promise to reduce the traffic accidents and fatalities. Therefore, there is a need for, and it would be advantageous to have, an improved relative positioning system and method to increase relative position accuracy and, consequently, vehicular safety.

SUMMARY OF THE INVENTION

The invention provides in general a method and system for the determination of the position of vehicles using vehicular communications based on the IEEE 802.11 standard. In particular, the invention provides a method for determining the relative position of one vehicle vs. another vehicle. An example of relative position determination is the determination whether one vehicle travels in the same lane as the other, or in a lane to the left or right of the other vehicle. The knowledge of the lane driven by each vehicle is important for safety. Therefore, the term "relative" refers to the lane location of one vehicle vs. the lane location of another vehicle.

The relative position determination is performed in one vehicle using data provided by the other vehicle through IEEE 802.11 communications carried through beacons. In the following description, "vehicle" refers to any motorized entity traveling on a road (e.g. a car, a van, a truck, a motorcycle and the like).

According to the invention there is provided a method for determining the position of one vehicle relative to another vehicle in a vehicular environment, comprising the steps of: in a first vehicle: receiving a IEEE 802.11 standard based communication from a second vehicle; and determining position of the second vehicle relative to the first vehicle based at least partially partly on the received communication.

According to the invention there is provided a method for determining the position of one vehicle relative to another vehicle in a vehicular environment, comprising the steps of in a first vehicle: receiving IEEE 802.11 beacon data from a second vehicle; measuring frequency shift and processing the beacon data together with the frequency shift and vehicle location data to determine the position of the second vehicle relative to the first vehicle.

According to the invention there is provided a system for determining the position of one vehicle relative to another vehicle in a vehicular environment, comprising a vehicular 802.11 communications and processing unit installed in a measuring vehicle, the communications and processing unit including a frequency, shift measurement module and a short-preamble autocorrelation module used for a LOS/NLOS (non-line-of-sight) indication, the communications and processing unit used fix receiving IEEE 802.11 beacon data from a measured vehicle, for measuring a frequency shift and for processing the beacon data together with the frequency shift and vehicle location data to determine the position of the measured vehicle relative to the measuring vehicle.

BRIEF DESCRIPTION OP THE DRAWINGS

The invention is herein described, by way of example only, with reference to the accompanying drawings, wherein.

DETAILED DESCRIPTION OF THE INVENTION

Figure 1:
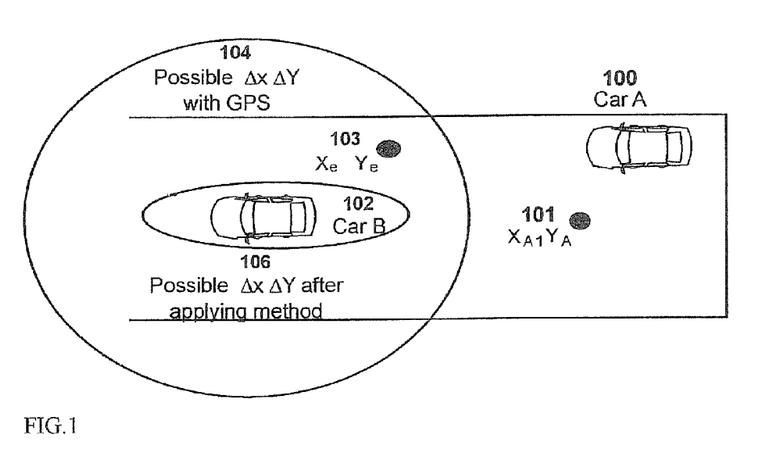
FIG. 1 shows an example of improved position accuracy obtained using a relative position measurement according to the invention.

The invention provides methods and systems through which a first "measuring" vehicle (also referred to herein as "car"), exemplified in FIG. 1 by a car A, determines a position of a second "measured" vehicle, exemplified in FIG. 1 by a car B, relative to its own position. Cars A and B are shown driving to the left on a three-lane highway. Instant positions of car A, indicated by $(X_A, Y_A)$ point 101, and car B, indicated by (XB, YB) point 103 are provided for example by a GPS measurement. This measurement contains error, and with the additional error of the map database, it may provide an inaccurate lane position for both cars. The accumulated error for cars A and B is illustrated graphically by a circle 104. In FIG. 1, the (erroneous) instant X,Y values indicate that car B drives on a lane right of car A, which is of course wrong and opposite to the real situation.

A method of the invention corrects the wrong conclusion drawn from the instant position data, and identifies correctly that car B is located on a lane to the left of that of car A. The method provides a position of car B relative to car A such that the combined error is reduced to an ellipse 106. Car A receives the instant position of car B through beacon information and runs an algorithm that determines the relative position. This relative position can be marked by $\Delta X$, $\Delta Y$, $\Delta Z$, where $\Delta X = X_B - X_A$, $\Delta Y = Y_B - YA$ and $\Delta Z = Z_B - Z_A$. Hereinafter it is assumed that Z (height) is the same for both vehicles and thus ignored.

Figure 2:
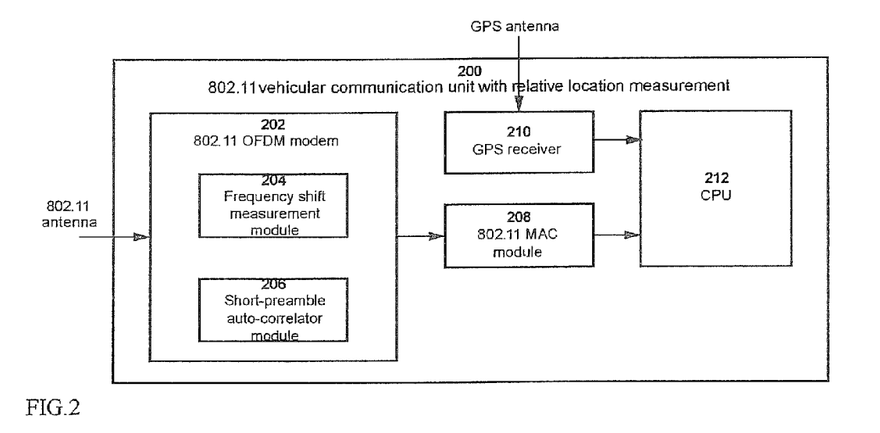
FIG. 2 shows a vehicular 802.11 communication unit with relative position measurement capabilities.

The determination of the relative position is facilitated by a vehicular 802.11 communications and processing unit 200 installed in car A and shown in FIG. 2. Unit 200 includes a 802.11 OFDM modem 202 for transmission and reception, modem 202 further including a frequency shift measurement module 204 and a short-preamble autocorrelation module 206 used for LOS/NLOS indication; a 802.11 MAC module 208; a GPS receiver 210; and a central processing unit (CPU) 212, all interconnected as shown.

Figure 3:
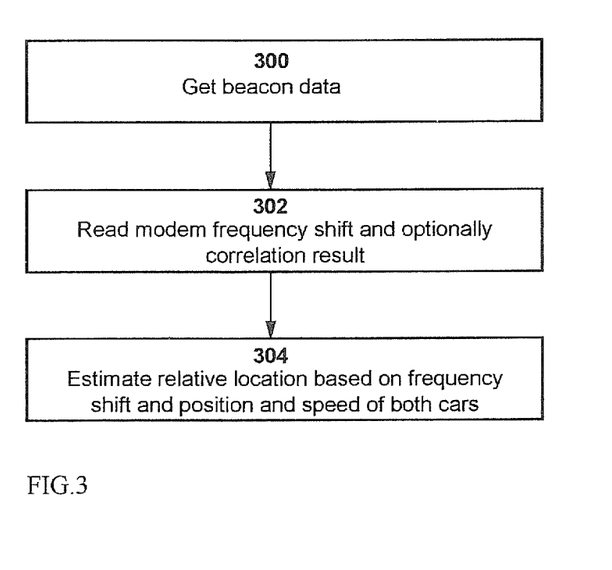
FIG. 3 shows a flow chart with the main steps in a method of fire invention.
Figure 4:
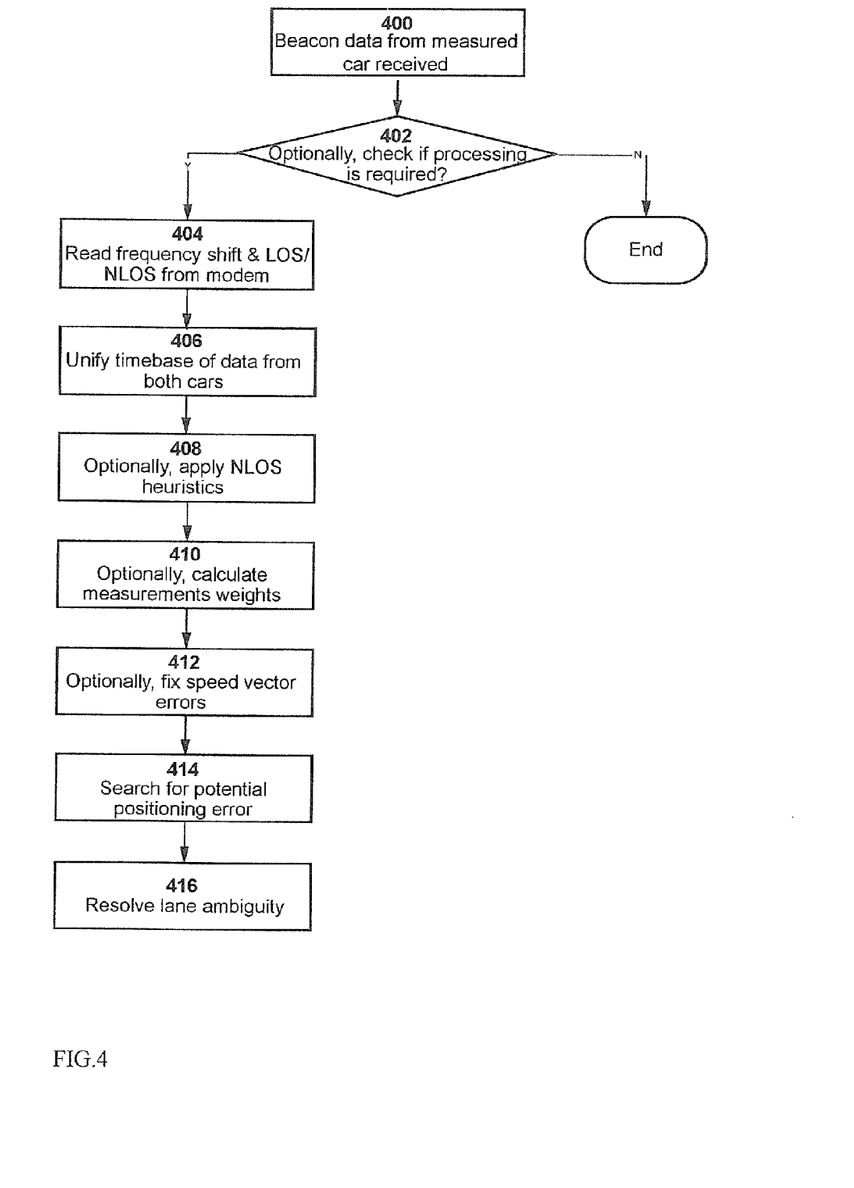
FIG. 4 shows a flow chart with added details on steps of tire method of FIG. 3.

FIG. 3 shows a flow chart with the main steps of a method for determining a vehicular relative position according to the invention. In step 300, beacon data from car B is received by modem 202 in car A. The beacon data includes the position and speed vector of car B. In step 302, a frequency shift is measured by frequency shift measurement module 204. In some embodiments, also in step 302, a LOS/NLOS indication is read by CPU 212 from modem 292, using autocorrelation provided by short-preamble autocorrelation module 20N. The measured frequency shift is then compared with one calculated using Eq. (1) below as part of step 304. The relative position between the two vehicles is determined by car A using the absolute positions and speeds of oars A and B, the measured frequency shift, and (optionally) the LOS/NLOS indication in step 304. The determination involves Angle-Of-Arrival (AOA) triangulation. The triangulation function requires several readings done by car A with different AOAs. The AOA is estimated using a Doppler shift which can be estimated from the frequency shift and which depends on the relative speed vector between car A and car B. As well known, the frequency shift value is given by:

$$\text{Frequency shift} = ClockSourceShift + (\Delta V + V_{err}) * \cos\left(\arctan\left(\frac{\Delta X - X_{err}}{\Delta Y - Y_{err}}\right) - \Delta\text{heading} - \text{heading}_{err}\right) \quad (1)$$

where $\Delta V$ is the known speed vector difference between car A and car B. $\Delta X$, $\Delta Y$ are known position differences between two the vehicles and $\Delta$heading is the difference in the known speed angle between the two vehicles (i.e. the angle between the direction of the speed or between the phases of the speed vectors. The frequency shift equation is non-linear with well known techniques for solution. The clock source shift is the difference between clock sources of car A and car B, which are unknown but resolved as part of the equation solving procedure (step 414 in FIG. 4). Note that it is assumed that Z is the same and unchanging during an interpolation process, described below. The unknowns are all the parameters with the "err" postfix which indicate measurement errors (for example heading$_{err}$ being an error in heading and V$_{err}$ being an error in the relative speed amplitude $\Delta V$). The frequency shift is measured for all beacon packets. Several different measurements are used for solving the unknown parameters of eq. (1). The estimation of the unknown parameters, leads to an estimate of the relative positioning. The estimation quality improves with a higher number of data points.

Note that this scheme is enabled by the 802.11 standard, which defines the beacon messages containing GPS information sent by each vehicle-to-vehicle communication unit. Other wireless protocols do not provide this information, and cannot use this scheme.

FIG. 4 gives more details of the steps in FIG. 3. In step 400, beacon data is received in oar A from car B. The content of the data is optionally checked in step 402 to decide if should be processed. If the relative position between the two vehicles has not changed from a last processing, then the processing will not provide any valuable data and is skipped. For example, if the relative distance between two vehicles had changed by less than 1 mete, the operation is stopped. Otherwise, processing continues from step 404.

In step 404, the frequency shift and, preferably, the LOS/NLOS indication are read from frequency shift measurement module 204 of car A by CPU 212. The LOS/NLOS indication is based on short-preamble autocorrelation results, read from short-preamble autocorrelation module 206, using the peak numbers and amplitudes of correlation results, as well known in the art. In the case of LOS, a dominant reflection exists, and the strongest correlation peak is much larger than all others. In the case of NLOS, there is no dominant ray and the correlation result will show several different peaks with similar amplitudes. NLOS indications are used in step 408 below, for applying heuristics.

In step 406, the timebase of both measured and measuring vehicles is unified as follows. The GPS of car A provides a new result once a second (this being an "update") from GPS receiver 210. The update is not correlated with beacon arrival from car B, as arriving from MAC module 208. Events of acceleration and steering angle change are uncorrelated as well. Since the events of both vehicles arrive at CPU 212 uncorrelated, interpolation is used to set events from both vehicles to arrive at the CPU on a single timebase. That is, the measurements of car B are interpolated as if they we received at CPU 212 exactly at the same time as measurements of car A, i.e. on a single timebase. The interpolation results are used for positioning adjustment. An exemplary positioning adjustment using simple linear interpolations is given in Eq. (2). Note that other and more complex interpolations may also be used.

$$X_{Badj} = X_B + (speed_B + acceleration_B/2) * \cos(heading_B + \text{steering angle}_B/2) * T_{diff}$$

$$Y_{Badj} = Y_B + (speed_B + acceleration_B/2) * \sin(heading_B + \text{steering angle}_B/2) * T_{diff} \quad (2)$$

where "A" ad "B" refer to the respective vehicles, $T_{diff}$ the interpolation time, i.e. the time from measurement an arrival to a new timebase time, the steering angle is a steering wheel angle and $X_{Badj}$ and $Y_{Badj}$ are adjusted X and Y values fore a B.

To illustrate the above in a specific example, assume that GPS updates of car A arrive at 0 s, 1 s, 2 s and so on. GPS updates of car B arrive at 0.5 s, 1.5 s, 2.5 s, and are sent shortly thereafter to car A. The position and speed information of car B is adjusted as if it was received at the same time ticks as those of oar A. The information arrived from car B at time 0.5 s is interpolated to predict the position of car B at time 1 s. For this reason, the distance driven by oar B in the time interval 1 s–0.5 s–0.5 s in predicted using car B's speed information.

The speed vectors of cars A and B are subtracted using exemplarily Euclidean arithmetic. The speed angle is provided below, where the first element considers the height difference between the two vehicles. A tan 2 is an arctangent function which represents the value as a tan 2(y,x) instead of a tan(y,x).

$$\frac{\sqrt{\Delta X^2 + \Delta Y^2}}{\sqrt{\Delta X^2 + \Delta Y^2 + \Delta Z^2}} * atan2(speed_A * \cos\ angle_A - speed_B * \cos\ angle_B * speed_A * \sin\ angle_A - speed_B * \sin\ angle_B) \quad (3)$$

The speed amplitude is as follows:

$$\sqrt{(speed_A * \cos\ angle_A - speed_B * \cos\ angle_B)^2 + (speed_B * \sin\ angle_B - speed_A * \sin\ angle_A)^2} \quad (4)$$

For example, when two vehicles drive toward each other, the relative speed is the sum of the speeds of the two vehicles. When the vehicles drive one after the other, the relative speed is the difference between the speeds of the two vehicles.

In optional step 408, NLOS heuristics are optionally applied to improve the relative positioning measurement accuracy. The Doppler shift measurement is accurate only when a dominant ray of LOS exists. Without it, reflections from numerous objects create spread (known in art as "Doppler spread"), without ability to detect the actual Doppler shift.

Two mechanisms for supporting distance measurement between fixed sensors daring NLOS are discussed in the literature. The moat common one (see e.g. "Enhanced Position Location with UWB in Obstructed LOS and NLOS Multipath Environments" by S. F. A Shah and A. H. Tewfik, Proc. XIII European Signal Proc. Conf. (EUSIPCO2005), Antlya, Turkey, September 2005 amid "A Hybrid TDOA/AOA Positioning Technique for Indoor UWB Systems" by Chin-Der Wann and Yi-Jing Yeh, The Institution of Engineering and Technology Seminar on Location Technologies, No 6-6, December 2007 pp. 1-5) ignores measurements taken under NLOS conditions. This is not a viable option in a vehicular environment. The second one discussed in the cited papers includes multiplying the measurements with a calculated factor based on heuristics. The inventors are not aware of heuristics being used in prior art in a vehicular environment. Therefore, heuristics for the vehicular environment were developed as follows:

Straight road blocking—a vehicle ahead of the measuring vehicle may be obstructed by a taller vehicle. The measured vehicle can still be received but without a LOS ray. Reflections arrive from objects on the sides, like vehicles in different lanes.

Curve blocking—LOS may be lost in a curve, for example when acoustic walls are placed.

Intersection blocking—buildings around intersection are likely to block direct rays.

The heuristics is an offset applied to the measurement for each of the three conditions.

The selected heuristics (measurement offsets) are determined using map information. The map can be received from a navigation database or learned locally using received beacons as described in co-pending PCT Application No. IB09/051111, filed 17 Mar. 2009 by the sane inventor. The map is analyzed to classify the driving conditions, according to the three cases above.

In optional step 410, measurement weights are calculated for improving results accuracy. The weighting process considers the likelihood of measurement correctness. It comes to minimize the impact of measurements suspected as erroneous, as more reliable measurements receive greater weight.

Speed change—Increases the probability of inaccurate instantaneous speed. Therefor, the weight of a measurement which has different speed value than previous one should be lowered.

Heading changes—can result from either driving in a curve or from a measurement error. Obviously, the latter should be accorded a lower weight. When driving into a curve, the actual beading at the time of taking the measurement may not be fully aligned with the time of packet reception, which is another good reason to lower the weight. Therefore, the weight of a measurement which has a different heading value than previous one should be lowered. For example, assume, for example that vehicle B was driving at a fixed speed and then accelerated to faster speed, until settling ad maintaining its current speed. The measurement performed when vehicle B was driving at a fixed speed, before and after the ac acceleration phase, would receive greater weight (and importance) than measurement taken during the acceleration phase.

In optional step 412, speed vector errors are fixed. The reasons for speed vector error include height differences between the two vehicles and inaccurate speed measurement. This step may be dripped if both reasons do not exist. The calculation of speed vector error is based on averaging errors of all measurements (both speed amplitude and speed angle errors). The positioning difference of two consecutive measurements should match the speed vector.

The speed amplitude error is given by:

$$\sum \left[ \frac{Speed_{Current} + Speed_{Previous}}{2} * (T_{current} - T_{Previous}) - \sqrt{(X_{Current} - X_{Previous})^2 + (Y_{Current} - Y_{Previous})^2} \right] * Weight / \sum Weight \quad (5)$$

The speed angle error is given by:

$$\sum \left[ \frac{angle_{Current} + (angle)_{Previous}}{2} - \tan^{-1}(X_{current} - X_{Previous} \cdot Y_{current} - Y_{Previous}) \right] * Weight / \sum Weight \quad (6)$$

For example, in case the provided speed has a fixed error, then the distance between two GPS updates is inconsistent with the speed. For example, if the error is 0.1 m/s, then after 10 seconds there will be an accumulated error of 1 meter in position change. These inconsistencies are compensated by step 412.

The search for potential GPS error values is performed in step 414. The search is based on comparing the measured frequency shift with the expected value, calculated using Eq (1). The search finds the GPS errors value that yields the lowest square error between the measured frequency shift and the calculated one (eq. 1).

The last step, 416, is used to resolve lane ambiguity, when two resells (two potential GPS error values) were found while solving the non-linear equation in step 414. A Doppler-based estimation is used to estimate cos(AOA). Since a cosine is a symmetrical function, meaning $\cos(\alpha)=\cos(-\alpha)$, the sign of AOA is unknown. That leads to a known relative vertical position between the two vehicle, but it is unknown if the measured vehicle is positioned right or left to measuring vehicle. Methods of resolving the ambiguity include using a maximal GPS error to limit unreasonable values and information about a lane number in the road to declare if the supposedly found lane exists. For example, if the maximal GPS error is 3 meters and the lane width is 2.5 meters, then if the error is 0 meters there is no ambiguity, since the potential error would have been 5 meters (2*2.5 meter—2 lanes away), which is greater than the maximal GPS error. Looking it another way, assume it is known that vehicle B is 2 meters on one side of vehicle A. Because of the ambiguity, this may 2 meters on the right or 2 meters on the left of vehicle A. If the error when located on the right is 0 meters, than the error when located on the left would be 4 meters (2*2). However, if the maximal GPS error is 3 meters, then it is impossible that vehicle B is located on the left of vehicle A. Further, data exchange between vehicles (for example vehicle A broadcasts the list of all vehicles around it, and so do all other vehicles) can provide vehicle anchors for determining relative positioning throughout the road. That is, if vehicle A and vehicle B are separated by one lane, if vehicle B and a vehicle C are also separated by one lane, and if vehicle A is two lanes left of vehicle C, then vehicle B is one lane left of vehicle C. A successful resolution of the ambiguity further refines the GPS error result value.

The various features and steps discussed above, as well as other known equivalents for each such feature or step, can be mixed and matched by one of ordinary skill in this art to perform methods in accordance with principles described herein. Although the disclosure has been provided in the context of certain embodiments and examples, it will be understood by those skilled in the art that the disclosure extends beyond the specifically described embodiments to other alternative a embodiments and/or uses and obvious modifications and equivalents thereof. Accordingly, the disclosure is not intended to be limited by the specific dies as of embodiments herein. For example where GPS signals are not available, instant vehicle location may be obtained from non-GPS measurements.

Accordingly, drawings and description disclosed herein illustrate technologies related to the invention, show examples of the invention, and provide examples of using the invention and are not to be construed as limiting the pre sent invention. Known methods, techniques, or systems may be discussed without giving details, so to avoid obscuring the principles of the invention. As it will be appreciated by one of ordinary skill in the art, the present invention can be implemented, modified, or otherwise altered without departing from the principles and spirit of the present invention. Therefore, the scope of the present invention should be determined by the following claims and their legal equivalents.

All patent applications and publications mentioned in this specification are herein incorporated in their entirety by reference into the specification, to the same extent as if each individual publication or patent application was specifically and individually indicated to be incorporated herein by reference. In addition, citation or identification of any reference in this application shall not be construed as an admission that such reference is available as prior at to the present invention.

The invention claimed is:

1. A method for determining the position of a first moving vehicle relative to a second moving vehicle in a vehicular environment, comprising the steps of:
   in the first moving vehicle:
   a) receiving each of a plurality of IEEE 802.11 standard based communications from the second moving vehicle, each said receiving including receiving a packet with packet data, from the second moving vehicle, that includes an absolute position and an absolute speed vector of said second moving vehicle; and
   b) determining the position of the first moving vehicle relative to the second moving vehicle based on information including IEEE 802.11 standard based communications received from only the second moving vehicle, by steps including:
      i) computing a preliminary relative position of the first moving vehicle relative to the second moving vehicle according to said absolute position and said absolute speed vector of said second moving vehicle, and
      ii) correcting said preliminary relative position in accordance with said receiving of said plurality of IEEE 802.11 standard based communications.

2. The method of claim 1, wherein said computing of said preliminary relative position is also according to an absolute position and an absolute speed vector of said first moving vehicle.

3. The method of claim 1, wherein said correcting includes Angle-Of-Arrival triangulation.

4. The method of claim 1, wherein said respective absolute position and speed vector of each moving vehicle include respective absolute Global Navigation Satellite System position and speed data of each moving vehicle.

5. The method of claim 1, wherein the determining of the position of the first moving vehicle relative to the second moving vehicle further includes using Non-Line-Of-Sight (NLOS) heuristics.

6. The method of claim 1, wherein the determining of the position of the first moving vehicle relative to the second moving vehicle further includes using a Line-Of-Sight (LOS)/Non-Line-Of-Sight (NLOS) indication.

7. The method of claim 6, wherein the using a Line-Of-Sight (LOS)/Non-Line-Of-Sight (NLOS) indication includes using NLOS heuristics.

8. The method of claim 1, wherein the determining the position of the first moving vehicle relative to the second moving vehicle further includes unifying a timebase of the first and second moving vehicles.

9. A method for determining the position of a first moving vehicle relative to a second moving vehicle in a vehicular environment, comprising the steps of:
   in the first moving vehicle:
   a) receiving a plurality of packets of IEEE 802.11 packet data from the second moving vehicle, said packet data including absolute position and speed vector data of the second moving vehicle; and
   b) processing the packet data of only the packets received from the second moving vehicle together with absolute position and speed vector data of the first moving vehicle to determine the position of the second moving vehicle relative to the first moving vehicle, by steps including:
      i) computing a preliminary relative position of the first moving vehicle relative to the second moving vehicle according to said absolute position and speed vector data of the moving vehicles, and ii) correcting said preliminary relative position in accordance with said receiving of said plurality of packets of IEEE 802.11 packet data.

10. The method of claim 9, wherein said correcting includes Angle-Of-Arrival triangulation.

11. The method of claim 9, wherein the absolute position data includes Global-Navigation-Satellite-System-based locations of both the first and second moving vehicle.

12. The method of claim 9, wherein the absolute position data includes non-Global-Navigation-Satellite-System based locations of both the first and second moving vehicle.

13. The method of claim 9, wherein the step of processing includes unifying a timebase of the first and second moving vehicles.

14. The method of claim 9, wherein the step of processing includes processing the packet data together with the vehicle location data and a Line-Of-Sight (LOS)/Non-Line-Of-Sight (NLOS) indication.

15. A system for determining the position of a measuring moving vehicle relative to a measured moving vehicle in a vehicular environment, comprising a vehicular 802.11 communications and processing unit installed in the measuring moving vehicle, the communications and processing unit including a short-preamble autocorrelation module used for a LOS/NLOS indication, the communications and processing unit used for receiving a plurality of packets of IEEE 802.11 packet data, from the measured moving vehicle, said packet data including absolute position and speed vector data of the measured moving vehicle, for processing the packet data of only the packets received from the measured moving vehicle together with absolute position and speed vector data of the measuring moving vehicle to determine the position of the measured moving vehicle relative to the measuring moving vehicle, said processing including:

i) computing a preliminary relative position of the measuring moving vehicle relative to the measured moving vehicle according to said absolute position and speed data of the moving vehicles, and ii) correcting said preliminary relative position in accordance with the receiving of said plurality of packets of IEEE 802.11 packet data.

16. The system of claim 15, wherein said correcting includes Angle-Of-Arrival triangulation.

17. The system of claim 15, wherein the communications and processing unit further includes a Global Navigation Satellite System receiver.

* * * * *